(12) United States Patent
Zhang et al.

(10) Patent No.: US 10,374,960 B2
(45) Date of Patent: Aug. 6, 2019

(54) APPARATUS, SYSTEMS AND METHODS FOR NETWORK SELECTION WITH PRIORITY CLASS

(71) Applicant: APPLE INC., Cupertino, CA (US)

(72) Inventors: Qin Zhang, Mountain View, CA (US); Longda Xing, San Jose, CA (US)

(73) Assignee: APPLE INC., Cupertino, CA (US)

(*) Notice: Subject to any disclaimer, the term of this patent is extended or adjusted under 35 U.S.C. 154(b) by 42 days.

(21) Appl. No.: 15/605,413

(22) Filed: May 25, 2017

(65) Prior Publication Data

US 2017/0346746 A1 Nov. 30, 2017

Related U.S. Application Data

(60) Provisional application No. 62/341,341, filed on May 25, 2016.

(51) Int. Cl.
| | |
|---|---|
| *G01R 31/08* | (2006.01) |
| *H04L 12/851* | (2013.01) |
| *H04W 48/16* | (2009.01) |
| *H04W 48/18* | (2009.01) |
| *H04W 48/14* | (2009.01) |
| *H04W 84/04* | (2009.01) |

(52) U.S. Cl.
CPC ............ *H04L 47/24* (2013.01); *H04W 48/14* (2013.01); *H04W 48/16* (2013.01); *H04W 48/18* (2013.01); *H04W 84/042* (2013.01)

(58) Field of Classification Search
CPC ....................................................... H04L 47/24
See application file for complete search history.

(56) References Cited

U.S. PATENT DOCUMENTS

| | | | | |
|---|---|---|---|---|
| 7,200,110 | B1* | 4/2007 | Burns | H04L 41/0896 370/225 |
| 2009/0168793 | A1* | 7/2009 | Fox | H04L 47/521 370/412 |
| 2010/0195643 | A1* | 8/2010 | Kodali | H04W 48/18 370/352 |
| 2013/0278412 | A1* | 10/2013 | Kelly | G08B 26/00 340/539.1 |
| 2014/0228030 | A1* | 8/2014 | Jung | H04W 8/26 455/436 |
| 2015/0011216 | A1* | 1/2015 | Jung | H04W 36/165 455/436 |
| 2015/0072679 | A1* | 3/2015 | Wirtanen | H04W 48/18 455/434 |
| 2015/0119029 | A1* | 4/2015 | Scribano | H04W 48/18 455/434 |
| 2015/0351014 | A1* | 12/2015 | Jung | H04W 48/18 370/338 |

* cited by examiner

*Primary Examiner* — Gerald A Smarth
(74) *Attorney, Agent, or Firm* — Fay Kaplun & Marcin, LLP (57) ABSTRACT

Described herein are apparatus, systems and methods for enhanced PLMN selection using priority class information. A method may comprise, at a user equipment ("UE"), identifying a plurality of networks, each network having an assigned priority class indicator, identifying a first network of the plurality of networks as having a first priority class indicator, identifying a second network of the plurality of networks as having the first priority class indicator, identifying the first priority class indicator as the highest priority class of the assigned priority class indicators, and selecting between the first network and the second network based a quality characteristic.

19 Claims, 6 Drawing Sheets

Table 100

EF-EHPLMN with added field for priority class

| Bytes | Description | M/O | Length |
|---|---|---|---|
| 1 to 3 | 1st EHPLMN | M | 3 Bytes |
| 4 | 1st EHPLMN priority class | M | 1 byte |
| 5 to 7 | 2nd EHPLMN | O | 3 Bytes |
| 8 | 2nd EHPLMN priority class | | 1 byte |
| ... | | | |
| (4n-3) to (4n-1) | Nth EHPLMN | O | 3 bytes |
| 4n | Nth EHPLMN Priority class | O | 1 bytes |

Fig. 1

Table 100

EF-EHPLMN with added field for priority class

| Bytes | Description | M/O | Length |
|---|---|---|---|
| 1 to 3 | 1st EHPLMN | M | 3 Bytes |
| 4 | 1st EHPLMN priority class | M | 1 byte |
| 5 to 7 | 2nd EHPLMN | O | 3 Bytes |
| 8 | 2nd EHPLMN priority class | | 1 byte |
| ... | | | |
| (4n-3) to (4n-1) | Nth EHPLMN | O | 3 bytes |
| 4n | Nth EHPLMN Priority class | O | 1 bytes |

Fig. 2

Table 200

EF-PLMNwACT with added field for priority class

| Bytes | Description | M/O | Length |
|---|---|---|---|
| 1 to 3 | 1st PLMN | M | 3 bytes |
| 4 to 5 | 1st PLMN Access Technology Identifier | M | 2 bytes |
| 6 | 1st PLMN priority class | M | 1 byte |
| ... | | | |
| 43 to 45 | 8th PLMN | M | 3 bytes |
| 46 to 47 | 8th PLMN Access Technology Identifier | M | 2 bytes |
| 48 | 8th PLMN priority class | M | 1 byte |
| 49 to 51 | 9th PLMN | O | 3 bytes |
| 52 to 53 | 9th PLMN Access Technology Identifier | O | 2 bytes |
| 54 | 9th PLMN priority class | O | |
| ... | | | |
| (6n-5) to (6n-3) | Nth PLMN | O | 3 bytes |
| (6n-2) to (6n-1) | Nth PLMN Access Technology Identifier | O | 2 bytes |
| 6n | Nth PLMN Priority class | O | 1 byte |

Fig. 3

Table 300

EF-OPLMNwACT with added field for priority class

| Bytes | Description | M/O | Length |
|---|---|---|---|
| 1 to 3 | 1st PLMN | M | 3 bytes |
| 4 to 5 | 1st PLMN Access Technology Identifier | M | 2 bytes |
| 6 | 1st PLMN priority class | M | 1 byte |
| ... | | | |
| 43 to 45 | 8th PLMN | M | 3 bytes |
| 46 to 47 | 8th PLMN Access Technology Identifier | M | 2 bytes |
| 48 | 8th PLMN priority class | M | 1 byte |
| 49 to 51 | 9th PLMN | O | 3 bytes |
| 52 to 53 | 9th PLMN Access Technology Identifier | O | 2 bytes |
| 54 | 9th PLMN priority class | O | |
| ... | | | |
| (6n-5) to (6n-3) | Nth PLMN | O | 3 bytes |
| (6n-2) to (6n-1) | Nth PLMN Access Technology Identifier | O | 2 bytes |
| 6n | Nth PLMN Priority class | O | 1 byte |

Fig. 4

APPARATUS, SYSTEMS AND METHODS FOR NETWORK SELECTION WITH PRIORITY CLASS

PRIORITY INFORMATION/INCORPORATION BY REFERENCE

This application claims priority to U.S. Provisional Application 62/341,341 entitled "Apparatus, Systems and Methods for Network Selection with Priority Class," filed on May 25, 2016, the entirety of which is incorporated herein by reference.

BACKGROUND

Wireless communication systems are rapidly growing in usage. Further, wireless communication technology has evolved from voice-only communications to also include the transmission of data, such as Internet and multimedia content. A user equipment ("UE") may be configured to establish a connection with different types of networks through the use of wireless communications protocols. Accordingly, based upon the capabilities of the hardware and software of the UE, the UE may connect with these different types of networks. For instance, the network may be a Universal Mobile Telecommunication System ("UMTS") or Long Term Evolution ("LTE") network for data connectivity, or the network may be a Global System for Mobile Communications ("GSM") or Code Division Multiple Access ("CDMA") network for voice connectivity.

LTE, commonly referred to as "4G LTE," is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols or 2G/3G networks, such as GSM/UMTS protocols and CDMA 2000 1× (e.g., 1×RTT or simply "1×") wireless communication protocols. In addition, standards are being developed for new 5G networks. Each of these different types of networks and protocols may be termed radio access technologies ("RATs").

In addition, network operators for these various RATS establish and provide a public land mobile network ("PLMN"), as defined in telecommunications regulations, for the purpose of providing mobile telecommunications services to the public. Accordingly, each network operator offering mobile services has its own PLMN that interconnects with other PLMNs as well as the public switched telephone network ("PSTN"). Furthermore, a PLMN may communicate with Internet Service Providers for internet access and data communications.

An exemplary PLMN is identified by a PLMN-ID based on a combination of a Mobile Country Code ("MCC") and a Mobile Network Code ("MNC"). In addition, an equivalent home PLMN ("EHPLMN") list allows for the home PLMN ("HPLMN") operator to identify alternative Network IDs as a HPLMN. For instance, when selecting a network that is not the HPLMN, the highest priority EHPLMN available shall be selected. The EHPLMN list is typically provisioned by the network operator and stored in a universal subscriber identity module ("USIM"). In addition to the EHPLMN list, the UE may also utilize a User PLMN ("UPLMN") list, wherein the end user may set the PLMN and the RAT, and an Operator PLMN ("OPLMN") list, wherein the operator may set the RAT. Accordingly, the entries in either the UPLMN list or the OPLMN list are PLMN and RAT combinations. Thus, a user or operator may specify the PLMN in the OPLMN/UPLMN lists.

In the current 3GPP specification, PLMNs in EHPLMN lists, UPLMN lists and OPLMN lists include absolute priorities. Specifically, the first PLMN on the list has the highest priority, the last PLMN on the list has the lowest priority, and no PLMN has the same priority as another PLMN. However, this absolute priority approach has limitations for both end users and operators.

SUMMARY

Described herein are apparatus, systems and methods for enhanced PLMN selection using priority class information. A method may be performed by a user equipment ("UE"). The method may include identifying a plurality of networks, each network having an assigned priority class indicator, identifying a first network of the plurality of networks as having a first priority class indicator, identifying a second network of the plurality of networks as having the first priority class indicator, identifying the first priority class indicator as the highest priority class of the assigned priority class indicators, and selecting between the first network and the second network based a quality characteristic.

Also described herein is a user equipment ("UE") device comprising a non-transitory memory having a program stored thereon, and a processor. Furthermore, execution of the program causes the processor to perform operations including identifying a plurality of networks, each network having an assigned priority class indicator, identifying a first network of the plurality of networks as having a first priority class indicator, identifying a second network of the plurality of networks as having the first priority class indicator, identifying the first priority class indicator as the highest priority class of the assigned priority class indicators, and selecting between the first network and the second network based a quality characteristic.

A further method performed by a UE is also described. The further method includes determining, by the UE, a Mobile Country Code ("MCC") and an assigned priority class indicator associated with a first network on which the UE is currently camped, identifying one or more networks having the same MCC as the first network, including the assigned priority class indicator of each of the one or more networks and when the assigned priority class indicator of at least one of the one or more networks has a higher priority than the assigned priority class indicator of the first network, performing a network search for the at least one of the one or more networks.

Also described herein is a further user equipment ("UE") device comprising a non-transitory memory having a program stored thereon, and a processor. Furthermore, execution of the program causes the processor to perform operations including determining a Mobile Country Code ("MCC") and an assigned priority class indicator associated with a first network on which the UE is currently camped, identifying one or more networks having the same MCC as the first network, including the assigned priority class indicator of each of the one or more networks and when the assigned priority class indicator of at least one of the one or more networks has a higher priority than the assigned priority class indicator of the first network, performing a network search for the at least one of the one or more networks.

DETAILED DESCRIPTION

The exemplary embodiments may be further understood with reference to the following description and the appended drawings, wherein like elements are referred to with the same reference numerals. The exemplary embodiments describe an apparatus, system and method for enhanced network selection using priority class. It should be noted that while the exemplary embodiments described herein refer to the selection of a PLMN, any type of network may be used and the systems and methods are not limited to selecting PLMNs.

Those skilled in the art will understand that the current methodology for network selection utilizes an absolute priority approach, wherein each network is given a specific priority that is unique to that network. In other words, none of the networks may have the same priority level as another network. This approach results in limitations to the end users, as well as the network operators.

The impact of absolute priority on the end user may include, for example, service acquisition delay. With absolute priority, the UE always needs to find the highest priority PLMN that is available. This may cause the UE to scan all bands and RATs, thereby resulting in significant service acquisition delays. In addition, absolute priority may cause significant battery drain to the UE by requiring the UE to perform periodic HPLMN searches to camp on any higher priority PLMNs that are available. Furthermore, the implementation of conventional absolute priority may lead to a reduction in the quality of service ("QoS") at the UE. A higher priority PLMN may not be able to provide the best QoS to the UE. For instance, if the higher priority PLMN only has coverage for a certain RAT (e.g., GSM), but a lower priority PLMN can provide a better RAT (e.g., LTE), the UE is forced to remain on an inferior RAT PLMN that has a lower data rate and higher battery drain.

With regards to the limitations of absolute priority to the network operators, an operator may own multiple PLMN-IDs. Each of these PLMNs may have the same priority, however the operator is unable to specify equal priority in EHPLMN. Accordingly, this may lead to service acquisition delays for home subscribers of the operator. In addition, roaming partners of the operator may own several PLMN-IDs within the same country and with the same priority. However, there is no way for the home operator to specify equal priority in OPLMN. Thus, this may lead to service acquisition delays for home subscribers of the operator. Furthermore, operators may have multiple regional roaming partners, wherein each of the partners may be considered the same from a business perspective. However, under the current absolute priority method, the operator is unable to specify equal priority amongst the partners. By not allowing the operator to specify priority, PLMN selection is left to randomness and may cause significant service acquisition delays.

In the exemplary systems and methods described herein, each of the PLMNs (e.g., EHPLMNs, UPLMNs, OPLMNs, etc.) within a selector file of the UE may be associated with a priority class. The exemplary priority class may be an integer number starting from 1, wherein the greater the number equates to a lower priority. For instance, a priority class of 1 may have the highest priority followed by a priority class of 2 having a lower priority. One important distinction from the conventional absolute priority method describe above is that multiple PLMNs may belong to the same priority class. Those skilled in the art will understand that other designations besides integers may be used to designate priority.

Figure 1:
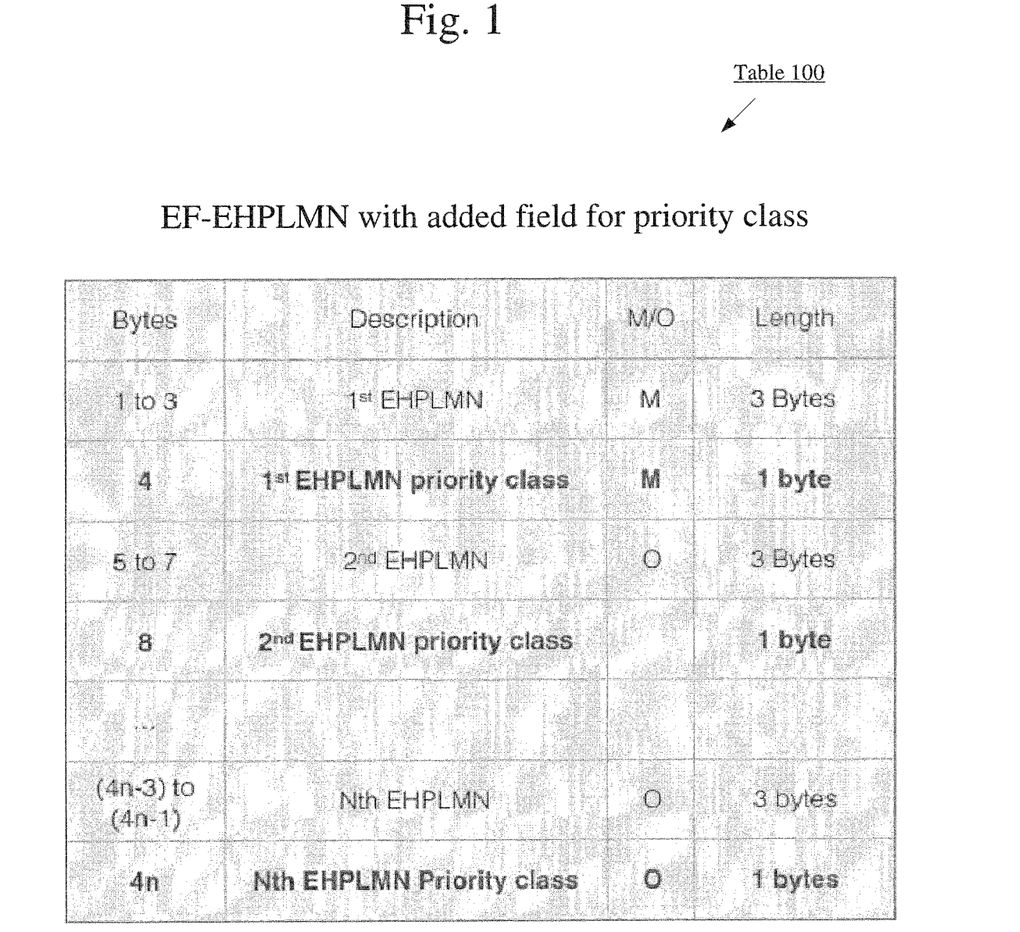
FIG. 1 shows a table for implementing PLMN selection with priority class for an exemplary elementary file ("EF") of an EHPLMN according to various embodiments described herein.

FIG. 1 shows a table 100 for implementing PLMN selection with priority class for an exemplary elementary file ("EF") of an EHPLMN. Those skilled in the art will understand that the EF for the EHPLMN may be defined by a length of bytes, wherein each EHPLMN is represented by bytes 1-4n (e.g., bytes 1-3 identify a first EHPLMN, bytes 5-7 identify a second EHPLMN, etc.). Conventional absolute priority assigns a priority to each EHPLMN based on its position within the EF. However, as illustrated in table 100, a newly added field to the EF-EHPLMN may include "priority class" (e.g., at byte 4, at byte 8, at byte 4n, etc.). Accordingly, while the first EHPLMN resides at a higher position than the second EHPLMN within the table 100, the actual priority of the EHPLMN is defined by the newly created priority class field. Thus, the first, second, . . . nth EHPLMNs in table 100 only references the position of the respective EHPLMNs in the EF-EHPLMN, but not the priority.

Figure 2:
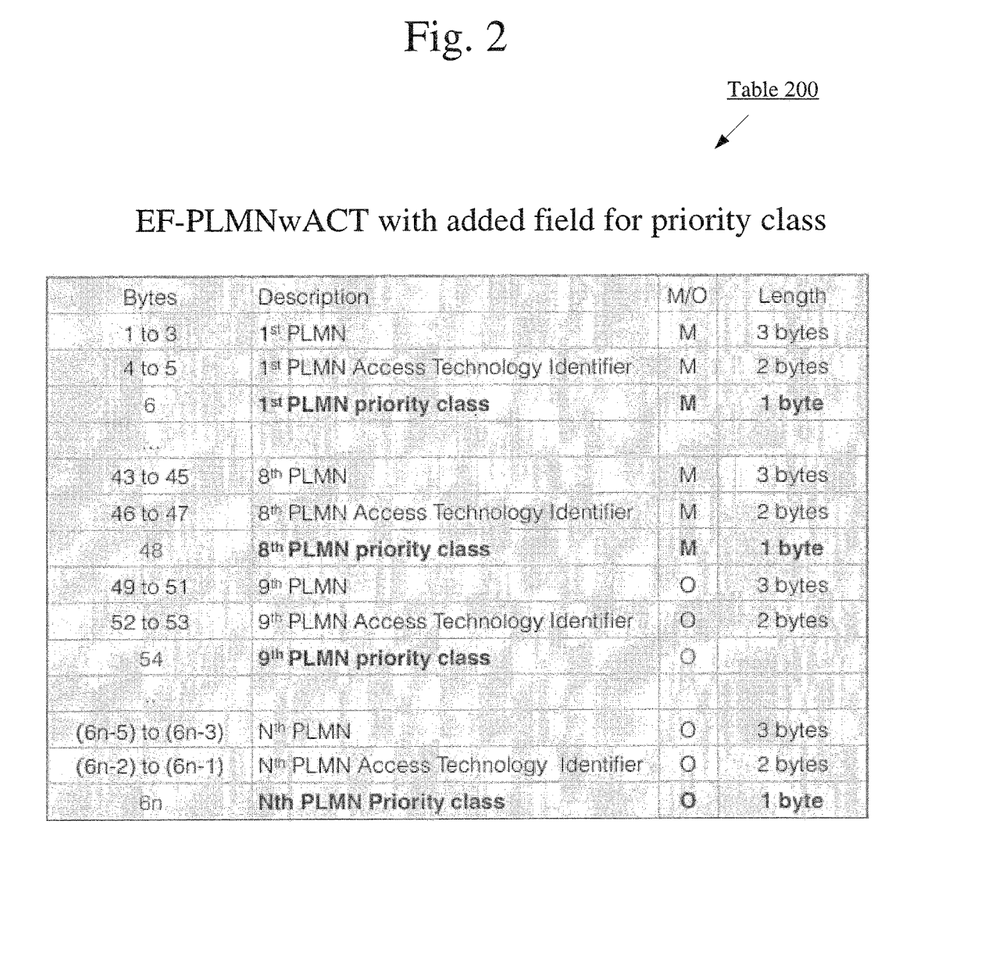
FIG. 2 shows a table for implementing PLMN selection with priority class for an exemplary EF of a user controlled PLMN selector with access technology ("PLMNwACT") of an exemplary UPLMN according to various embodiments described herein.

FIG. 2 shows a table 200 for implementing PLMN selection with priority class for an exemplary EF of a user controller PLMN selector with access technology ("PLMNwACT") of an exemplary UPLMN. Once again, those skilled in the art will understand that the EF for the PLMNwACT may be defined by a length of bytes, wherein each UPLMN is represented by bytes 1-6n (e.g., bytes 1-3 identify a first PLMN, bytes 4-5 identify a first PLMN Access Technology Identifier, bytes 43-45 identify an eighth PLMN, bytes 46-47 identify an eighth PLMN Access Technology Identifier, etc.). Conventional absolute priority assigns a priority to each UPLMN based on its position within the EF. However, as illustrated in table 200, a newly added field to the EF-PLMNwACT may include "priority class" (e.g., at byte 6, at byte 48, at byte 54, at byte 6n, etc.). Similar to the table 100 for EHPLMN, while the first PLMN resides at a higher position than the eighth PLMN within the table 200, the actual priority of the UPLMN is defined by the newly created priority class field. Accordingly, the first, eighth, . . . nth PLMNs in table 200 only references the position of the respective PLMNs for user selection in the EF-PLMNwACT, but not the priority.

Figure 3:
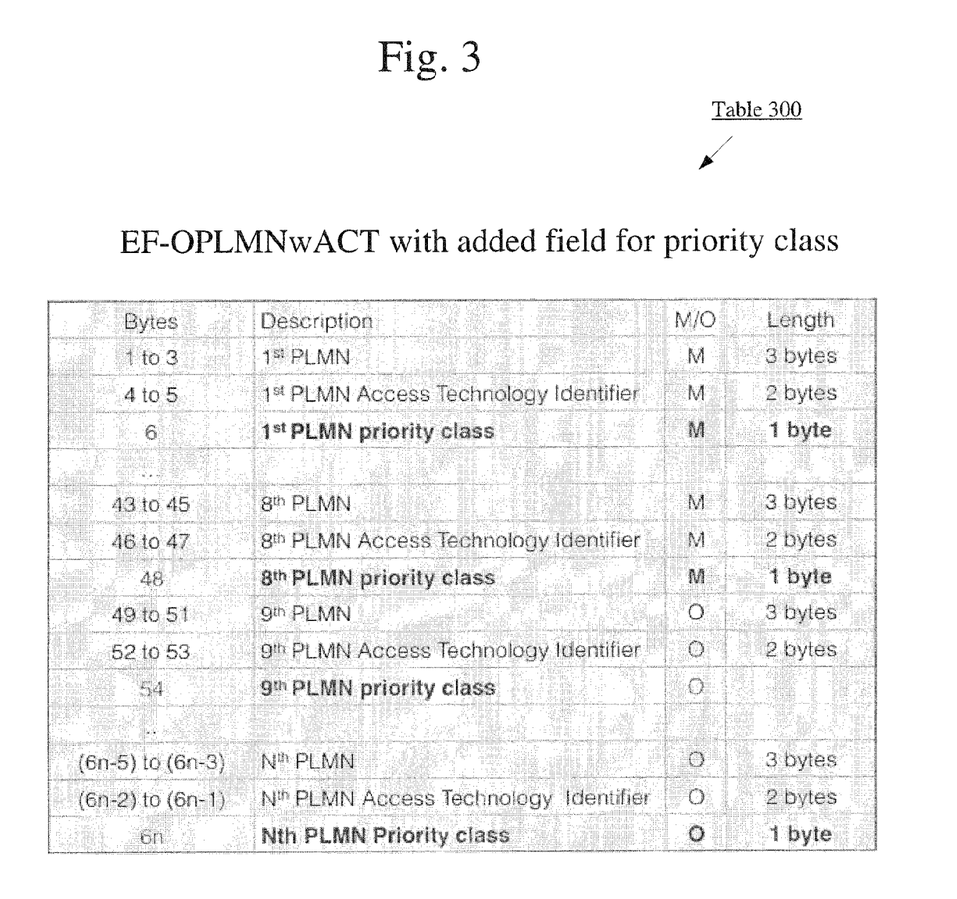
FIG. 3 shows a table for implementing PLMN selection with priority class for an exemplary EF of an operator controlled PLMN selector with access technology ("OPLMNwACT") of an exemplary OPLMN according to various embodiments described herein.

FIG. 3 shows a table 300 for implementing PLMN selection with priority class for an exemplary EF of an operator controlled PLMN selector with access technology ("OPLMNwACT") of an exemplary OPLMN. Similar to the table 200 for UPLMN, those skilled in the art will understand that the EF for the OPLMNwACT may be defined by a length of bytes, wherein each OPLMN is represented by bytes 1-6n (e.g., bytes 1-3 identify a first PLMN, bytes 4-5 identify a first PLMN Access Technology Identifier, bytes 43-45 identify an eighth PLMN, bytes 46-47 identify an eighth PLMN Access Technology Identifier, etc.). Conventional absolute priority assigns a priority to each UPLMN based on its position within the EF. However, as illustrated in table 300, a newly added field to the EF-OPLMNwACT may include "priority class" (e.g., at byte 6, at byte 48, at byte 54, at byte 6n, etc.). Likewise, while the first PLMN resides at a higher position than the eighth PLMN within the table 300, the actual priority of the OPLMN is defined by the newly created priority class field. Accordingly, the first, eighth, . . . nth PLMNs in table 300 only references the position of the respective PLMNs for operator selection in the EF-OPLMNwACT, but not the priority.

Figure 4:
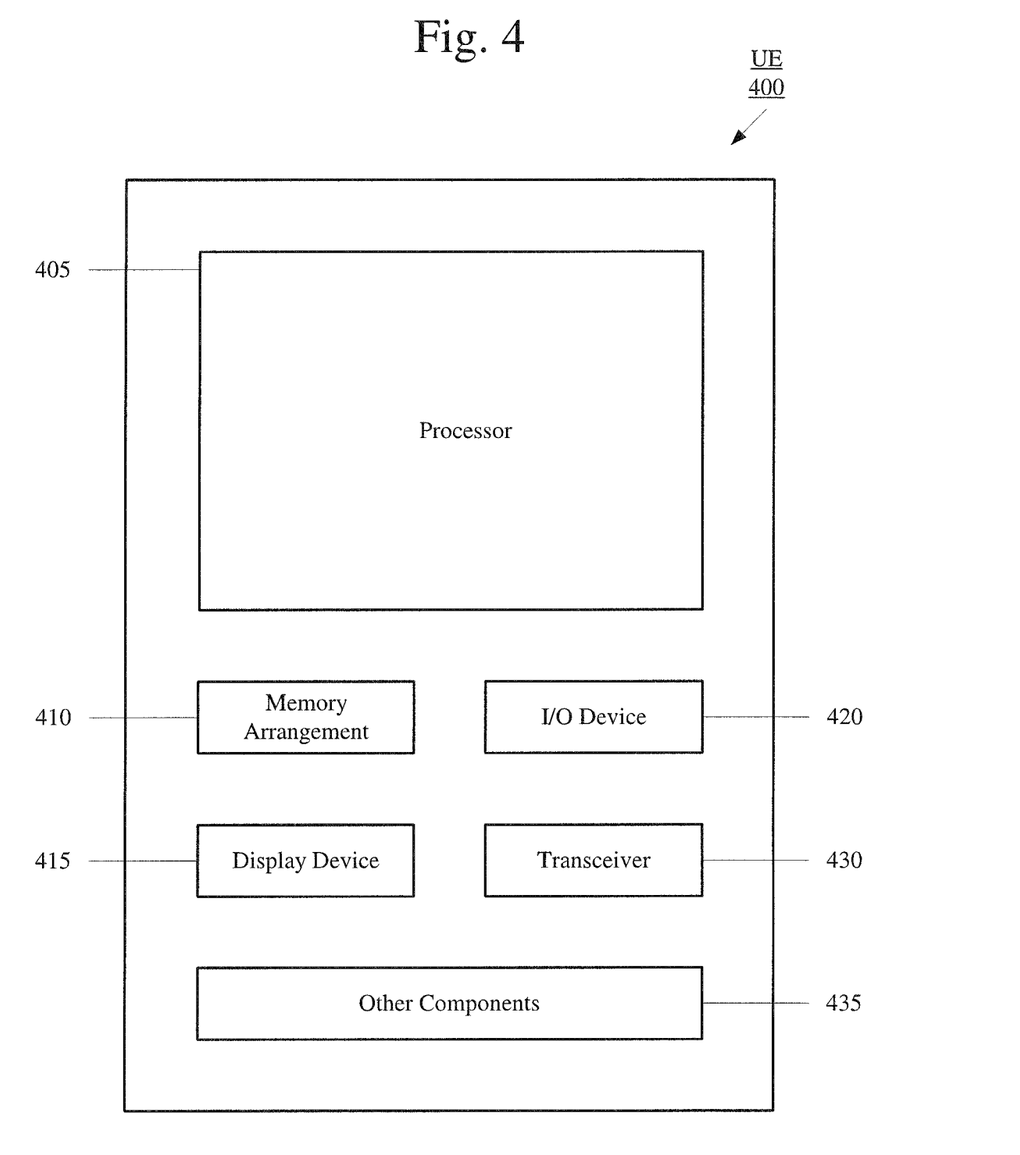
FIG. 4 shows a mobile device, such as the UE, for performing enhanced PLMN selection using priority class according to various embodiments described herein.

FIG. 4 shows an exemplary UE 400 for performing enhanced PLMN selection using priority class according to various embodiments described herein. The UE 400 may represent any electronic device that is configured to perform wireless functionalities described herein. Accordingly, the UE 400 may be a portable device such as a smartphone, a tablet, a phablet, a laptop, a wearable, an Internet of Things ("IoT") device, etc. In another example, the UE 400 may be a client stationary device such as a desktop terminal. The UE 400 may be configured to perform cellular and/or WiFi functionalities. The UE 400 may include a processor 405, a memory arrangement 410, a display device 415, an input/output (I/O) device 420, a transceiver 430, and other components 435. The other components 435 may include, for example, an audio input device, an audio output device, a battery, a data acquisition device, ports to electrically connect the UE 400 to other electronic devices, etc.

The processor 405 may be configured to execute a plurality of applications of the UE 400. It should be noted that the above noted applications each being an application (e.g., a program) executed by the processor 405 is only exemplary. The functionality associated with the applications may also be represented as a separate incorporated component of the UE 400 or may be a modular component coupled to the UE 400, e.g., an integrated circuit with or without firmware. In addition, in some UEs, the functionality described for the processor 405 is split among two processors, a baseband processor and an application processor ("AP"). The exemplary embodiments may be implemented in any of these or other configurations of a UE.

The memory 410 may be a hardware component configured to store data related to operations performed by the UE 400. Specifically, the memory 410 may store data related to various applications. The display device 415 may be a hardware component configured to show data to a user while the I/O device 420 may be a hardware component that enables the user to enter inputs. It should be noted that the display device 415 and the I/O device 420 may be separate components or integrated together such as a touchscreen.

The UE 400 may be configured to communicate directly with one or more networks, such as an LTE network, a legacy radio access network ("RAN"), a WiFi network, etc. One skilled in the art will understand that exemplary legacy RANs may include a circuit switched network, e.g., GSM, UMTS, CDMA, 1×RTT, 1×, etc. With regards to the exemplary embodiments, the UE 400 may establish a connection with the LTE RAN to, among other functionalities, perform data transfers, voice calls and exchange SMS messages with the LTE network.

The transceiver 430 may be a hardware component configured to transmit and/or receive data. That is, the transceiver 430 may enable communication with other electronic devices directly or indirectly through one or more networks based upon an operating frequency of the network. The transceiver 430 may operate on a variety of different frequencies or channels (e.g., set of consecutive frequencies). Thus, one or more antennas (not shown) coupled with the transceiver 430 may enable the transceiver 430 to operate on the LTE frequency band, the frequency bands of legacy RANs, as well as over a WiFi network. Accordingly, the transceiver 430 may include any number of components such as a cellular modem and non-cellular wireless communication components, such as a WiFi modem, a GPS receiver, a Bluetooth modem, etc.

Figure 5:
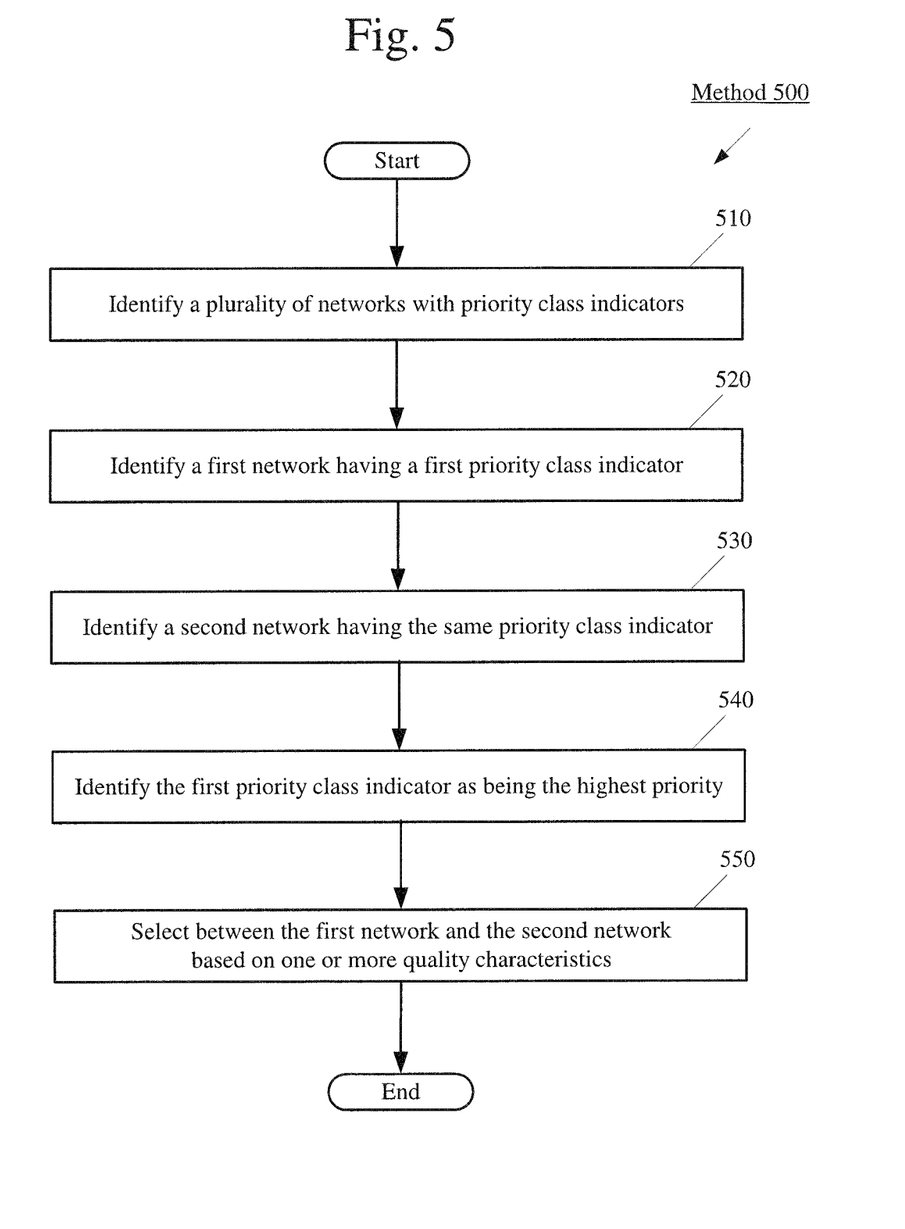
FIG. 5 shows an exemplary method for performing automatic PLMN selection using priority class according to various embodiments described herein.

FIG. 5 shows an exemplary method 500 for performing automatic PLMN selection using priority classes according to various embodiments described herein. It should be noted that while the exemplary method 500 is described as being performed by the processor 405, any combination of hardware and software components of the UE 400, such as, but not limited to a baseband processor, an applications processor ("AP"), the transceiver 430, etc., may be capable performing the methods described herein.

In 510, the processor 405 may identify a plurality of networks, each network having an assigned priority class indicator. It should be noted that the plurality of networks may be identified based on the EF for a given geographic location. While a plurality of networks may be listed on the EF in different positions (e.g., a first PLMN resides at a higher position than a second PLMN), the actual priority of the network may be defined by the priority class field for each network. Furthermore, networks may have the same priority class indicator. Thus, networks that have the same priority class indicator are treated as having the same priority during PLMN selection.

In 520, the processor 405 may identify a first network of the plurality of networks as having a first priority class indicator. In 530, the processor 405 may identify a second network of the plurality of networks as having the first priority class indicator. Regardless of the position of the second network in the EF, the second network will be considered to have the same priority as the first network since they share the same priority class indicator.

In 540, the processor 405 may identify the first priority class indicator as the highest priority class of the assigned priority class indicators. In other words, during 510, the processor 405 may have identified numerous networks available to the UE 400, wherein each of these networks has an assigned priority class indicator. While some of the networks may share the same priority class indicator, such as the first network and the second network, other available networks may have different priority class indicators. Accordingly, in 540 the processor 405 may evaluate the priority class indicators for all of the networks identified in 510 and identify the first priority class indicator as having the highest priority based on the priority class field.

In 550, the processor 405 may select between the first network and the second network based on a quality characteristic, such as, but not limited to a measured quality of signal and an expected quality of service. For instance, the selection between networks may be performed through a background search while the UE 400 is camped on a network (e.g., the first network) to avoid any service interruption. If the background search reveals that the second network that has the same priority as the first network, but has a better signal quality than the first network, the UE 400 may transition to the second network since the first and second networks have the same priority.

Accordingly, the processor 405 may use signal quality as the quality characteristic (e.g., data rate, voice quality, a received signal strength indicator ("RSSI"), a channel quality indicator ("CQI"), etc.). For instance, the UE may select the network having the highest signal quality, such that the networks are selected in order of decreasing signal quality. If the highest priority networks (e.g., the first network and the second network) have equal signal quality, the processor 405 may then select the network based on random order. As noted above, if the quality characteristic(s) for all networks (e.g., PLMNs) with the same priority class are the same, the UE may randomly select one network (e.g., PLMN), or the UE may select any of them to acquire service.

Figure 6:
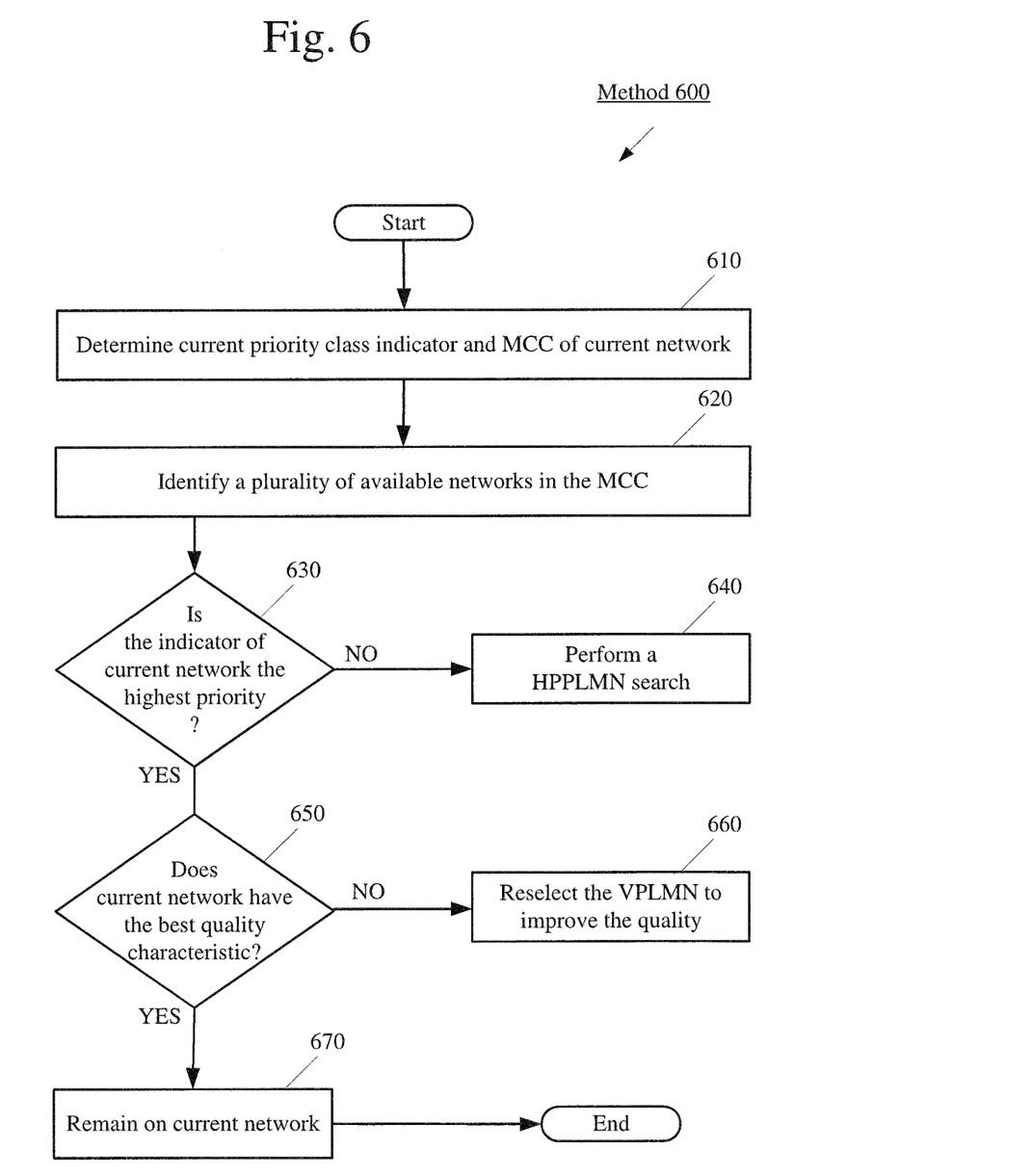
FIG. 6 shows an exemplary method for performing automatic PLMN selection using priority class while on a visited PLMN ("VPLM") according to various embodiments described herein.

FIG. 6 shows an exemplary method 600 for performing automatic PLMN selection using priority classes while on a visited PLMN ("VPLMN") according to various embodiments described herein. Those skilled in the art will understand that a VPLMN is a PLMN on which the UE 400 has roamed onto when leaving the UE's home PLMN ("HPLMN").

In 610, the processor 405 may determine the current priority class indicator of the current VPLMN and the current Mobile Country Code ("MCC") associated with the VPLMN. The MCC of the VPLMN is a number uniquely identifying a given country that is broadcast in System Information Blocks ("SIBs"). Additionally, Location Area Identity ("LAI") is also broadcast information that may contain the MCC.

In 620, the processor 405 may identify a plurality of further available networks with the same MCC, wherein each of the available networks has an assigned priority class indicator. In 630, the processor 405 may determine whether the current VPLMN belongs to the highest priority class within the MCC based on the current priority class indicator and assigned priority class indicators of the available networks. If the current class indicator is not the highest priority PLMN available, then in 640 the UE 400 may conduct a high priority PLMN ("HPPLMN") search. Accordingly, the UE 400 may only perform the HPPLMN search if there are one or more PLMNs having a higher priority class within the same MCC as the current MCC of the VPLMN.

Referring back to 630, if the current class indicator is the highest priority PLMN available, then the UE 400 does not need to conduct the HPPLMN search, and the method 600 may advance to 650. In 650, the processor 405 may identify quality characteristic(s) of other VPLMNs having the same priority class indicator as the priority class indicator of the current VPLMN.

If the quality characteristic (e.g., measured and/or expected data rate, voice quality, etc.) of another VPLMN having the same priority class indicator are better than that of the current VPLMN, in 660, the UE 400 may reselect the VPLMN to acquire improved quality of service at the same priority class level. For instance, the UE 400 may initially be camped on LTE coverage of a first network and then move to a GSM coverage of that first network. If LTE coverage is available from a second network within the same priority class as the first network, the UE 400 may select the second network for better quality characteristics.

If the quality characteristic(s) at any other VPLMN having the same priority class indicator are not better than that of the current VPLMN, in 670 the UE 400 may remain on the current VPLMN. For instance, the quality characteristics may be derived in many ways, such as a measured quality of signals on each of the networks, an expected quality of service of each of the networks (e.g., expected data rates, expected delays, etc., that are associated with LTE versus 3G versus GSM networks), etc. Accordingly, the quality characteristics may be based on the nature of the RAT. For example, in terms of characteristics such as data rate, battery consumption and security, LTE may exhibit better quality characteristics over legacy RATs such as GSM, UMTS, etc.

The quality characteristic, such as the QoS measured of the network, may be learned by the UE 400. For example, if the UE 400 experiences frequent call drops on a particular network, the UE 400 may then learn to avoid this network and select other networks within the same priority class. Furthermore, the quality characteristics (e.g., QoS matrix/parameters) of a network could be derived from crowd-sourced data, wherein the quality characteristics are collected from numerous devices throughout the network. This crowd-sourced data may then be processed to generate a quality matrix that may then be stored in a network server and downloaded to the UE 400. It should also be noted that different types of UEs may have different sets of quality characteristics parameters. For instance, a mobile telephone (e.g., a voice centric device) may consider circuit switched ("CS") QoS over packet switched ("PS") service, while a mobile tablet (e.g., a data centric device) may not consider CS related QoS at all.

According to one exemplary embodiment for an EHPLMN configuration, an operator may have provisioned three HPLMNs with the following PLMN-IDs: PLMN A, PLMN B, and PLMN C. Furthermore, all three of the PLMNs may be assigned with equal priority. In this case, the operator may provision the EHPLMN with a single priority class. Specifically, PLMN A has a priority class indicator of 1; PLMN B has a priority class indicator of 1; and PLMN C has a priority class indicator of 1. Since each of the PLMNs A-C have the same priority class indicators, the PLMN may be selected by the exemplary UE 400 based on alternative criteria, such as a measured or expected signal quality characteristics. Thus, this example shows multiple PLMNs that all have the same priority class.

According to a further exemplary embodiment for an EHPLMN configuration, an operator may have been provisioned three HPLMNs with the following PLMN-IDs: PLMN A, PLMN B, and PLMN C. In this case, the MCC of PLMN A may be different from the MCC of PLMN B and PLMN C. For example, PLMN B and PLMN C may be neighbor country carriers. The operator may require the exemplary UE 400 to select PLMN A first in the border area of the country having the MCC of PLMN A. However, PLMN B and PLMN C may still be available, but will have a lower priority class than PLMN A. Specifically, PLMN A may have a priority class indicator of 1; while PLMN B and PLMN C may have a priority class indicator of 2. Since the PLMN A has a higher priority class indicator than that of the other PLMNs, PLMN A will have priority during the selection process, even though PLMN B and PLMN C are available to the UE 400.

According to a further exemplary embodiment for an EHPLMN configuration, an operator may have been provisioned three HPLMNs with the following PLMN-IDs: PLMN A, PLMN B, and PLMN C. Furthermore, all three of the PLMNs may be assigned different priority class indicators. Specifically, different priority classes may be assigned to each PLMN such that PLMN A has a priority class indicator of 1; PLMN B has a priority class indicator of 2; and PLMN C has a priority class indicator of 3. Once again, since the PLMN A has a higher priority class indicator than that of the other PLMNs, PLMN A will have priority during the selection process. However, PLMN B will also have priority over PLMN C.

According to an exemplary embodiment for an OPLMN configuration, an operator may have a roaming agreement with three regional PLMNs with the following PLMN-IDs: PLMN A, PLMN B, and PLMN C. Furthermore, all three of the regional PLMNs may belong to the same operator and be assigned with the same priorities. In this case, the operator may configure all three PLMNs in the OPLMN with the same priority. Specifically, PLMN A has a priority class indicator of 1; PLMN B has a priority class indicator of 1; and PLMN C has a priority class indicator of 1. Since each of the PLMNs A-C have the same priority class indicators, the exemplary UE 400 has the opportunity to select any of these PLMNs based on alternative criteria, such as one or more quality characteristics.

Moreover, since all three PLMNs have the same priority class, the UE 400 may select the first PLMN that the UE 400 identifies. In this manner, the UE 400 may then stop searching once any one of the PLMNs is identified and camp on that PLMN. Thus, the initial selection is not required to be based on the quality criteria, but may simply be based on the identification of a PLMN that has the highest priority class indicator. This may save the resources (e.g., battery power, processor resources, etc.) of the UE 400 because the UE 400 may cease scanning and/or searching once a PLMN with the highest priority class is identified. However, once the UE 400 camps on a PLMN, the UE 400 may perform periodic background searches for the other PLMNs having the same priority class and then switch PLMNs based on the quality criteria.

As noted above, under the legacy absolute priority method, the first listed PLMN in the EF (e.g., PLMN A) would be selected when available, regardless of any alternative criteria. In other words, even if PLMN B and PLMN C are found by the UE 400, the UE 400 cannot camp on either of these networks until PLMN A is found or a search is conducted on all bands and RATs to conclude that PLMN A is unavailable to the UE 400. Thus, under the legacy scheme, the UE 400 may waste valuable resources searching for a PLMN that may never be found.

According to a further exemplary embodiment for an OPLMN configuration, an operator may have a roaming agreement with three regional partners with the following PLMN-IDs: PLMN A, PLMN B, and PLMN C. Accordingly, all three of the regional PLMNs may belong to different regional operators. However the operator may assign each of the PLMNs A-C with the same priorities since the regional partner networks may be treated as the same from a business perspective. For instance, the operator may provide an unlimited data plan to their subscribers while roaming, and the operator may have data roaming plans with several regional partners. Thus, the operator may allow its subscribers to have the best available experience by camping on the regional partner PLMN that has the best operating characteristics (e.g., measure or expected network characteristics, QoS, etc.). This would be the case if each of the regional partners is assigned equal priority. This equal priority for each of the regional partners may be based on a revenue and/or business perspective from the point of view of the operator. Thus, in this case the operator may provision the OPLMN with a single priority class. Specifically, PLMN A has a priority class indicator of 1; PLMN B has a priority class indicator of 1; and PLMN C has a priority class indicator of 1.

Alternatively, the operator may prioritize these regional partners. For instance, the operator may still have roaming agreements with the regional partners that operate PLMN A, PLMN B and PLMN C, but PLMN A and PLMN B may provide the operator with better revenue than PLMN C (e.g., the roaming agreement may be more favorable with PLMN A and PLMN B). Accordingly, the operator would like for the exemplary UE 400 to select PLMN A or PLMN B over PLMN C. In this case the operator may provision the OPLMN with two different single priority classes. Specifically, PLMN A and PLMN B have a priority class indicator of 1; however, PLMN C has a priority class indicator of 2.

According to a further exemplary embodiment for an OPLMN configuration, an operator may configure PLMN A, PLMN B, and PLMN C with different priority classes. Similar to the EHPLMN configuration discussed above, PLMN A has a priority class indicator of 1; PLMN B has a priority class indicator of 2; and PLMN C has a priority class indicator of 3. Once again, since each of the PLMN A has a higher priority class indicator than that of the other PLMNs, PLMN A will have priority during the selection process.

According to a further exemplary embodiment for an OPLMN configuration, an operator may have a roaming agreement with three regional partners for a specific MCC with the following PLMN-IDs: PLMN A, PLMN B, and PLMN C. Furthermore, all three of the PLMNs of the regional partners may belong to the same operator and be assigned with the same priorities. Specifically, PLMN A has a priority class indicator of 1; PLMN B has a priority class indicator of 1; and PLMN C has a priority class indicator of 1. In this scenario, the UE 400 may be allowed to skip the HPPLMN searching. For instance, the UE 400 may be camped on PLMN B, which is the highest priority class in the MCC. Accordingly, the UE 400 may not need to perform any further searching for HPPLMNs since none of the other available PLMNs have a higher priority. Furthermore, if the UE 400 features a HPPLMN search timer, the UE 400 may be instructed to skip the HPPLMN search upon the expiration of the search timer and remain camped on the PLMN B.

It may be noted that the exemplary embodiments are described with reference to the LTE and LTE-Advanced communication system. However, those skilled in the art will understand that the exemplary embodiments may be applied to selecting networks, such as PLMNs, within any wireless communication schemes including those having different characteristics from the LTE scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE"):
      identifying a plurality of networks, each network having an assigned priority class indicator;
      identifying a first network of the plurality of networks as having a first priority class indicator;
      determining whether a second network of the plurality of networks has the first priority class indicator;

determining whether the first priority class indicator is a highest priority class of the assigned priority class indicators; and when the first network and the second network both have the first priority class indicator and the first priority class indicator is the highest priority class, selecting between the first network and the second network based on a quality characteristic.

2. The method of claim 1, wherein the quality characteristic includes one of a measured quality of signal or an expected quality of service.

3. The method of claim 2, wherein the measured quality of the signal includes one of a data rate, a voice quality, a received signal strength indicator ("RSSI"), or a channel quality indicator ("CQI").

4. The method of claim 1, wherein the priority class indicator is stored within a priority class field of an elementary file of the UE.

5. The method of claim 4, wherein the EF is one of an equivalent home public land mobile network ("EHPLMN"), a user controlled PLMN selector ("UPLMN") and an operator controlled PLMN selector ("OPLMN").

6. The method of claim 1, further comprising:
camping on the selected one of the first and second networks.

7. The method of claim 1, further comprising:
when the first and second networks are not available, identifying a third network having the first priority class indicator; and
camping on the third network.

8. The method of claim 7, further comprising:
when the third network is not available, identifying a fourth network that has a second priority class indicator that is a lower priority than the first priority class indicator.

9. A user equipment ("UE") device, comprising:
a non-transitory memory having a program stored thereon; and
a processor, wherein execution of the program causes the processor to perform operations comprising:
identifying a plurality of networks, each network having an assigned priority class indicator;
identifying a first network of the plurality of networks as having a first priority class indicator;
determining whether a second network of the plurality of networks has the first priority class indicator;
determining whether the first priority class indicator is a highest priority class of the assigned priority class indicators; and
when the first network and the second network both have the first priority class indicator and the first priority class indicator is the highest priority class, selecting between the first network and the second network based on a quality characteristic.

10. The UE of claim 9, wherein the quality characteristic includes one of a measured quality of signal or an expected quality of service.

11. A method, comprising:
at a user equipment ("UE"):
determining, by the UE, a Mobile Country Code ("MCC") and an assigned priority class indicator associated with a first network on which the UE is currently camped;
identifying one or more networks having the same MCC as the first network, including the assigned priority class indicator of each of the one or more networks;
when the assigned priority class indicator of at least one of the one or more networks has a higher priority than the assigned priority class indicator of the first network, performing a network search for the at least one of the one or more networks; and
when the assigned priority class indicator of at least one of the one or more networks has a same priority as the assigned priority class indicator of the first network, determining a quality characteristic of the first network and the at least one of the one or more networks and performing a network reselection based on the quality characteristic of the first network and the at least one of the one or more networks.

12. The method of claim 11, further comprising:
when the assigned priority class indicator of all of the one or more networks has a lower priority than the assigned priority class indicator of the first network, remaining camped on the first network.

13. The method of claim 11,
wherein the quality characteristic is based on a quality of service parameter.

14. The method of claim 11, wherein the quality characteristic is based on a type of radio access technology (RAT) of the network.

15. The method of claim 11, wherein the quality characteristic is based on operating experience of the UE with the network.

16. The method of claim 11, wherein the quality characteristic is based on operating experiences of a plurality of UEs with the network.

17. The method of claim 11, further comprising:
identifying a further network having a different MCC that is available for camping by the UE;
selecting the further network for camping only after determining none of the networks having the MCC of the first network are available for camping.

18. A user equipment ("UE") device, comprising:
a non-transitory memory having a program stored thereon; and
a processor, wherein execution of the program causes the processor to perform operations comprising:
determining a Mobile Country Code ("MCC") and an assigned priority class indicator associated with a first network on which the UE is currently camped;
identifying one or more networks having the same MCC as the first network, including the assigned priority class indicator of each of the one or more networks;
when the assigned priority class indicator of at least one of the one or more networks has a higher priority than the assigned priority class indicator of the first network, performing a network search for the at least one of the one or more networks;
when the assigned priority class indicator of all of the one or more networks has a same or lower priority than the assigned priority class indicator of the first network, remaining camped on the first network;
when the assigned priority class indicator of at least one of the one or more networks has a same priority as the assigned priority class indicator of the first network, determining a quality characteristic of the first network and the at least one of the one or more networks; and
performing a network reselection based on the quality characteristic of the first network and the at least one of the one or more networks.

19. The UE of claim 18, wherein the quality characteristic is based on a quality of service parameter.

\* \* \* \* \*